United States Patent
Wang et al.

(10) Patent No.: US 12,483,987 B2
(45) Date of Patent: Nov. 25, 2025

(54) METHOD AND COMMUNICATION CIRCUIT FOR COMMUNICATING WITH BASE STATION

(71) Applicant: Realtek Semiconductor Corp., HsinChu (TW)

(72) Inventors: Lihua Wang, Suzhou (CN); Mingzhi Guo, Suzhou (CN); Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 274 days.

(21) Appl. No.: 18/090,464

(22) Filed: Dec. 28, 2022

(65) Prior Publication Data

US 2023/0232332 A1    Jul. 20, 2023

(30) Foreign Application Priority Data

Jan. 14, 2022 (CN) .......................... 202210040935.7

(51) Int. Cl.
*H04W 76/27* (2018.01)
*H04W 52/02* (2009.01)
*H04W 74/0808* (2024.01)

(52) U.S. Cl.
CPC ... *H04W 52/0245* (2013.01); *H04W 74/0808* (2013.01); *H04W 76/27* (2018.02)

(58) Field of Classification Search
CPC ............. H04W 50/0245; H04W 76/27; H04W 74/0808
See application file for complete search history.

(56) References Cited

U.S. PATENT DOCUMENTS

| | | | |
|---|---|---|---|
| 2006/0002495 A1 | 1/2006 | Shirakawa | |
| 2007/0264962 A1* | 11/2007 | Ueno | H04B 1/707 455/574 |
| 2012/0002561 A1* | 1/2012 | Su | H04W 52/0229 714/704 |
| 2022/0030625 A1* | 1/2022 | Yang | H04L 5/001 |
| 2024/0284403 A1* | 8/2024 | Agiwal | H04W 68/02 |

FOREIGN PATENT DOCUMENTS

| | | |
|---|---|---|
| CN | 102316565 A | 1/2012 |
| CN | 103841628 A | 6/2014 |

OTHER PUBLICATIONS

IEEEStd.802.11™-2020(RevisiontoIEEEStd.802.11-2016) (Year: 2020).*

* cited by examiner

*Primary Examiner* — Jae Y Lee
*Assistant Examiner* — Nam P. Cao
(74) *Attorney, Agent, or Firm* — Winston Hsu

(57) ABSTRACT

A method of a communication circuit includes: using an analog circuit to receive and process a beacon signal transmitted from an antenna unit and through a channel to generate a baseband signal; using a digital circuit to process the baseband signal; during a predetermined early reception period corresponding to the beacon signal sent from a base station, waking up the analog circuit and at least one portion of the digital circuit to detect the signal power strength of the channel; and, determining whether make the analog circuit and the digital circuit enter a standby mode to save power according to the signal power strength.

8 Claims, 5 Drawing Sheets

METHOD AND COMMUNICATION CIRCUIT FOR COMMUNICATING WITH BASE STATION

BACKGROUND OF THE INVENTION

1. Field of the Invention

The present invention relates to a wireless network communication scheme, and more particularly to a communication circuit and method for communicating with a base station through a channel.

2. Description of the Prior Art

Generally speaking, a conventional wireless communication circuit will be in a low power consumption state to save power when no signals are received. When it is needed to receive a beacon signal sent from a base station, the conventional wireless communication circuit must be able to accurately wake up its analog and digital circuit elements at a precise timing to avoid that a reception of the beacon signal fails. However, waking up the circuit elements at the precise timing cannot be achieved only through software calculations since this is associated with the network state or environment of the wireless communication. It is often necessary for the conventional wireless communication circuit to wake up the circuit elements early. This causes the unnecessary power consumption for the conventional wireless communication circuit, and cannot effectively meet the requirements of power saving.

SUMMARY OF THE INVENTION

Therefore one of the objectives of the present invention is to provide a communication circuit and a corresponding method for communicating with a base station through a channel, so as to solve the above-mentioned problems.

According to embodiments of the invention, a communication circuit for communicating with a base station through a channel is disclosed. The communication circuit comprises an analog circuit, a digital circuit, and a control circuit. The analog circuit is coupled to an antenna unit, and used for receiving and processing a beacon signal, sent from the antenna unit through the channel, to generate a baseband communication signal. The digital circuit is coupled to the analog circuit, and used for processing the baseband communication signal. The control circuit is coupled to the analog circuit and the digital circuit, and used for waking up the analog circuit and at least one portion of elements of the digital circuit to detect a signal power strength of the channel during a predetermined early reception period corresponding to the beacon signal sent by the base station, and also used for determining whether to control the analog circuit and the digital circuit entering a standby mode to save power according to the signal power strength.

According to the embodiments, a method of a communication circuit for communicating with a base station through a channel is further disclosed. The method comprises: using an analog circuit to receive and process a beacon signal, sent from an antenna unit through the channel, to generate a baseband communication signal; using a digital circuit for processing the baseband communication signal; waking up the analog circuit and at least one portion of elements of the digital circuit to detect a signal power strength of the channel during a predetermined early reception period corresponding to the beacon signal sent by the base station; and, determining whether to control the analog circuit and the digital circuit entering a standby mode to save power according to the signal power strength.

These and other objectives of the present invention will no doubt become obvious to those of ordinary skill in the art after reading the following detailed description of the preferred embodiment that is illustrated in the various FIGs. and drawings.

DETAILED DESCRIPTION

The present invention aims at providing a technical solution, a communication device, and a corresponding method capable of successfully receiving a beacon signal of a wireless network during a specific time period under a condition of reducing the power consumption as much as possible. The provided technical solution is used to periodically or irregularly perform a power detection and assessment and/or a channel state detection and assessment when a beacon signal is expected to be received, so as to switch to a low power state (LPS) mode at an appropriate timing to achieve the power saving requirements. For example, when a beacon signal is expected to be received but the time point when the beacon signal actually arrives is unspecific, the technical solution of the invention can be employed to only wake up portion(s) of the circuit elements, that are needed to execute some operations, to periodically or irregularly perform the power detection and assessment and/or channel state detection and assessment when the communication device enters an early reception mode or becomes in a predetermined early reception period, so as to switch to the LPS mode at an appropriate timing to reduce the power consumption.

Further, the technical solution provided by the present invention can be applied to the LPS modes in a variety of different application scenarios of a wireless network, wherein the wireless network can be a wireless network that uses beacon signals for communication under various versions of the IEEE 802.11 specification. The wireless network provided by a local area network standard may also be a wireless network provided by other wireless communication standards using beacon signals for communication, such as a communication standard adopted by a mobile communication system or Bluetooth communication. In addition, in one embodiment, the LPS mode for example may include a shutdown mode, a sleep mode, or a standby mode. In practice, the standby mode maybe a power gated mode and/or a clock gated mode, and so on. The power consumption of the standby mode is higher than the power consumption of the shutdown mode, but the corresponding mode switching speed is higher than the speed of the shutdown mode; other operations will be detailed later.

Figure 1:
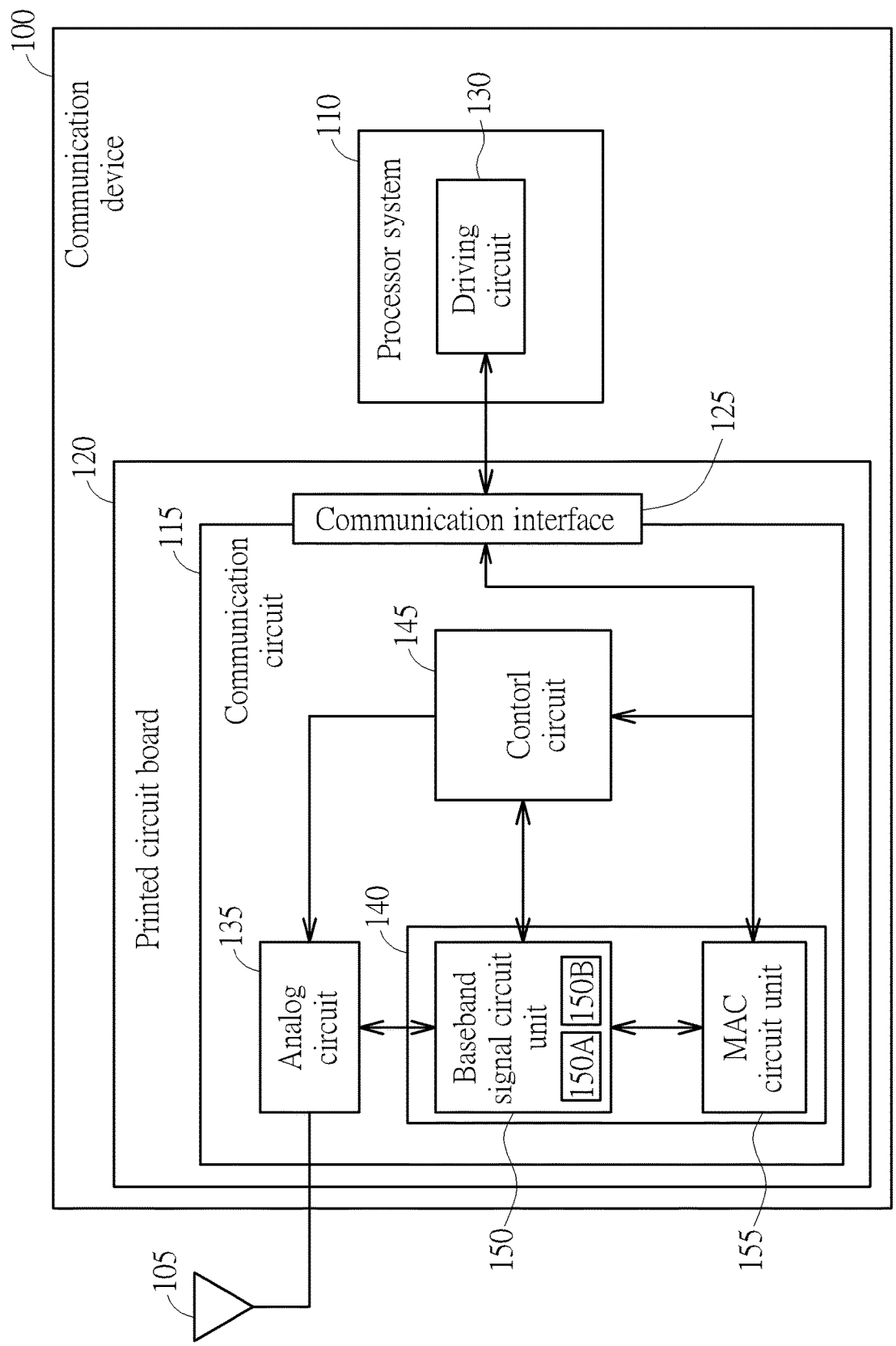
FIG. 1 is a block diagram of a communication device according to an embodiment of the present invention.

Please refer to FIG. 1. FIG. 1 is a block diagram of a communication device 100 according to an embodiment of the present invention. The communication device 100 includes an antenna unit 105, a processor system 110, and a communication circuit 115. The communication circuit 115 is used for communicating with at least one base station through at least one channel, and it for example (but not limited) is an integrated circuit chip disposed on a printed circuit board 120 and comprises a communication interface 125 connected to the processor system 110 to communicate with a driving circuit 130 of the processor system 110. The communication circuit 115 includes an analog circuit 135, a digital circuit 140, and a control circuit 145. The communication circuit 115 for example conforms to a communication standard specification of a wireless local area network (WLAN) system. The base station is a WLAN access point. The analog circuit 135 for example is or includes a radio frequency signal circuit unit, and the analog circuit 135 is coupled to the antenna unit 105. In this embodiment, the analog circuit 135 for example is used as a receiver and is used for receive and process a beacon signal or a data packet signal, sent from the antenna unit 105 through the channel, to generate a baseband communication signal. The digital circuit 140 includes a baseband signal circuit unit 150 and a media access control (MAC) circuit unit 155. The digital circuit 140 is coupled to the analog circuit 135 and used for processing the baseband communication signal.

The control circuit 145 is, for example, a firmware circuit, which is coupled to the analog circuit 135 and the digital circuit 140 and is used for waking up the analog circuit 135 and at least one portion of components/elements of the digital circuit 140 to detect a signal power strength/magnitude/level of the channel during a predetermined early reception period corresponding to the beacon signal sent by the base station, and for determining whether to control the analog circuit 135 and the digital circuit 140 entering a standby mode to save power during the predetermined early reception period according to the signal power strength.

For example, taking the baseband signal circuit unit 150 as an example, the baseband signal circuit unit 150 includes, for example, a plurality of circuit modules such as a power detection module 150A for detecting the received signal strength indication (RSSI), a channel state detection module 150B (e.g., a clear channel assessment (CCA) detection module), and other different processing modules. For power detection, the power detection module 150A and/or the channel state detection module 150B can be awakened to perform the power detection, and the other circuit modules can enter the standby mode. For the CCA channel detection, only the channel state detection module 150B is needed to be awakened to perform the detection, and the other circuit modules can enter the standby mode. In practice, the standby mode in this situation refers to, for example, a power gated mode or a clock gated mode.

In one embodiment, when the signal power strength is smaller than a specific threshold, the control circuit 145 determines that an initial synchronization signal of the beacon signal has not yet arrived at the communication circuit 115 through the channel, and controls the analog circuit 135 and the digital circuit 140 switching into the standby mode during the predetermined early reception period. When the signal power strength is greater than or equal to the specific threshold, the control circuit 145 determines that the initial synchronization signal of the beacon signal has arrived at the communication circuit 115, and then it wakes up the other portions of the components/elements of the digital circuit 140 to make the other portions of the components/elements switch from, for example, the standby mode (or shutdown mode) into a signal reception mode.

Further, in other embodiments, when the signal power strength is greater than the specific threshold, the control circuit 145 is arranged to control the at least one portion of the elements of the digital circuit 140 (i.e., the channel state detection module 150B) to perform the CCA detection. When the signal power strength is greater than the specific threshold and the CCA detection does not indicate an idle state, the control circuit 145 determines that an initial synchronization signal of the beacon signal has arrived at the communication circuit 115, and then wakes up the other portions of the elements of the digital circuit 140 to make the elements enter the signal reception mode. When the signal power strength is greater than the specific threshold and the CCA detection indicates the idle state, the control circuit 145 determines that the initial synchronization signal of the beacon signal has not yet arrived at the communication circuit 115, and controls the analog circuit 135 and the digital circuit 140 (e.g., the power detection module 150A and the channel state detection module 150B) entering the standby mode to save power.

Figure 2:
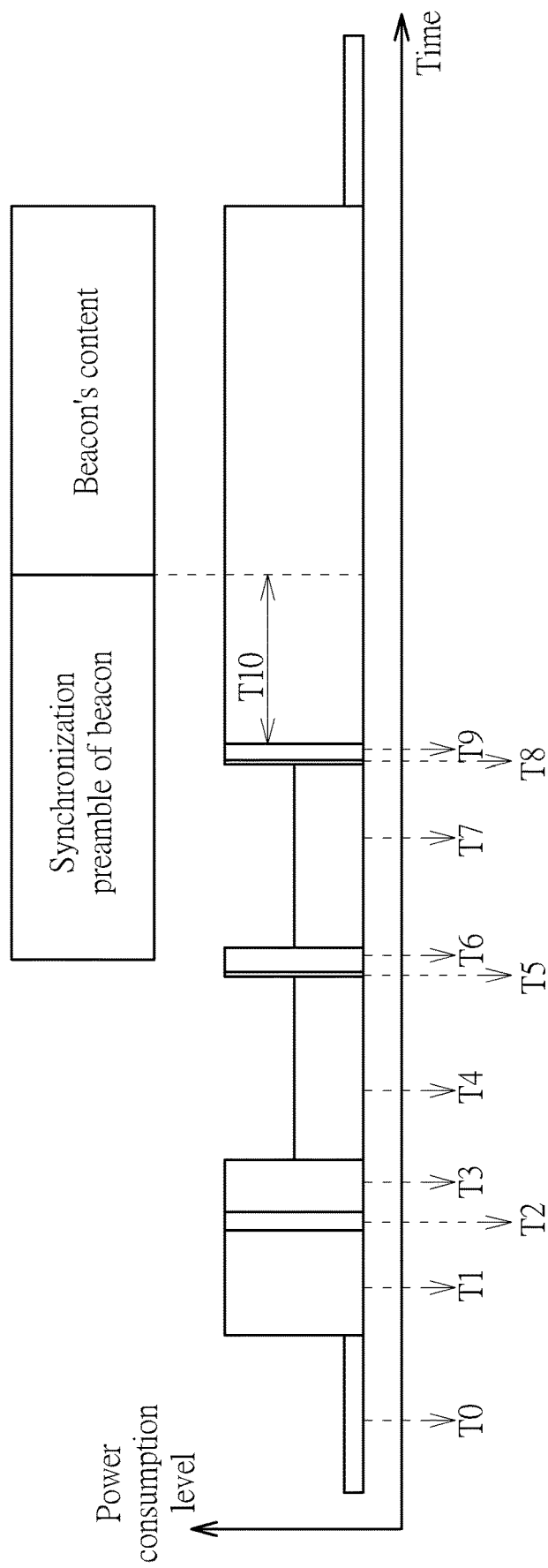
FIG. 2 is a schematic timing diagram of the operations of the communication device shown in FIG. 1 in a first application scenario.

Please refer to FIG. 2. FIG. 2 is a schematic timing diagram of the operations of the communication device 100 shown in FIG. 1 in a first application scenario. As shown in FIG. 2, in the first application scenario, the communication device 100 wakes up from a sleep mode to receive a beacon signal. For example, the sleep mode may be a shutdown mode. The total transmission time of the beacon signal may be about 2 milliseconds. However, the time point which the beacon actually arrives at the communication device 100 may have different delays due to the network environment, and the communication device 100 is arranged to enter an early reception mode or is in a predetermined early reception period at first. For example, the communication device 100 may be awakened 5-8 milliseconds early so as to prepare to receive the beacon signal. The above-mentioned time lengths are not meant to a limitation of the present invention.

The provided technical solution of the present invention is capable of effectively controlling partial circuit (s) (or module (s)) of the communication device 100 be awakened to check and determine whether the initial synchronization signal of the beacon signal, e.g., the synchronization preamble of the beacon signal, has arrived at the communication device 100 or not, so as to determine whether to enter the normal signal reception mode to receive the subsequent content signals following the beacon signal. For example, if the beginning of the beacon signal has not yet arrived at the communication device 100, then the analog circuit 135 (e.g., the radio frequency signal circuit unit) and/or the digital circuit 140 (e.g., the baseband signal circuit unit 150 and/or the MAC circuit unit 155) can be controlled to enter the LPS mode to reduce power consumption. The X-axis of FIG. 2 corresponds to time, and the Y-axis corresponds to the power consumption amounts/levels, e.g., the average power consumptions per second (but not limited). In FIG. 2, except for the blocks indicating the synchronization preamble and contents of the beacon signal, the width of each of the different rectangular square blocks corresponds to a corresponding time length, and its height corresponds to the value of power consumption.

Before the starting point of the time period T1, i.e., the time period T0, the communication device 100 for example is in the LPS mode (e.g., the shutdown mode). At this time, the communication device 100 is in the sleep state and does not receive beacons. The power supply provided for the elements or modules of the analog circuit 135 and digital circuit 140 is turned off, and the power consumption in this situation is minimal. It should be noted that in other embodiment the LPS mode may be a power-gated mode or a clock-gated mode. In the power-gated mode, the power supply provided for a portion of element(s) or module(s) is turned off. In the clock-gated mode, power supply provided for the portion of element(s) or module(s) is not turned off but the clock signal used by the portion of element(s) or module(s) is gated or not provided, so that the portion of element(s) or module(s) in this situation is unable to operate and accordingly the power is saved.

Then, in response to the trigger signal sent from the driving circuit 130 through the communication interface 125, the control circuit 145 will expect to receive a beacon. Accordingly, during the time period T1, the control circuit 145 wakes up and controls the analog circuit (i.e., the RF signal circuit unit) 135 to perform the RF settling and to make the analog circuit 135 operate in a normal RF signal transmission and reception state, and also it wakes up and controls a specific portion of elements or modules of the digital circuit 140 to operate in a normal state. The specific portion of elements or modules for example may be the power detection module 150A and the channel state detection module 150B of the baseband signal circuit unit 150. In this situation, the other portions of elements or modules have not yet been awakened. Alternatively, the control circuit 145 may wake up and control a specific element or module of the MAC circuit unit 155 to enter a normal state, and the other elements or modules of the MAC circuit unit 155 are not awakened. A time period from the shutdown mode to become awakened may require about 100-120 microseconds; however, this is not meant to be a limitation.

No matter whether it is awakened from the shutdown mode or switched from the standby mode, during the time period T2, the control circuit 145 then controls the digital circuit 140, such as the baseband signal circuit unit 150, to perform the power detection. For example, in order to improve the accuracy of power detection and reduce power consumption, the required time period can be configured as 0.8-3.2 microseconds (but not limited). When the result obtained by the power detection meets the expected requirements (e.g., when the RSSI value is greater than a specific threshold), the control circuit 145 then controls the digital circuit 140 performing the CCA detection. Instead, when the result obtained by the power detection does not meet the expected requirements, the control circuit 145 determines and controls the analog circuit 135 and the digital circuit 140 returning back to the LPS mode to save power. In this application scenario, at the end of the time period T2, the control circuit 145 determines that the result obtained by the power detection meets the expected requirements.

Accordingly, during the time period T3, the control circuit 145 controls the digital circuit 140 such as the baseband signal circuit unit 150 to perform the CCA detection. If the resultant signal obtained by the CCA detection is pulled up ('1') during the time period T3, then this indicates that in this situation the synchronization preamble of the beacon has arrived, data transmitted through the channel, and the channel is not idle, so the communication device 100 is arranged to control other circuit elements (or modules) of the digital circuit 140 to enter a normal reception mode to receive subsequent contents of the beacon. On the contrary, if the resultant signal obtained by the CCA detection is not pulled up ('0') during the time period T3, then this indicates that the synchronization preamble of the beacon has not yet arrived and the channel is idle although the beacon is expected to be received at this time, and the communication device 100 enters the standby mode. In this situation, the control circuit 145 controls the analog circuit 135 and the elements or modules of the digital circuit 140 entering the standby mode to save power; the time period T3 can be set as 8-25 microseconds (but not limited).

Further, in other embodiments, the processing time of the time period T3 may not be set. That is, when the result of the power detection meets the expected requirements, the communication device 100 can immediately enter the normal reception mode without performing the CCA detection and assessment. In this situation, if the result of the power detection does not meet the expected requirements, then the communication device 100 will enter the LPS mode. In this application scenario, the resultant signal obtained by the CCA detection during the time period T3 is not pulled up ('0'), so the communication device 100 enters the standby mode, and during the time period T4 the analog circuit 135 and the elements (or modules) of the digital circuit 140 will enter the standby mode to save power. In practice, when entering the standby mode, the baseband signal circuit unit 150 in the digital circuit 140 is arranged to enter the clock gated mode to save power, and the time length of the time period T4 may be set to 45-90 microseconds (but not limited) in response to the reception of the beacon.

Then, after the time period T4 ends, the control circuit 145 during the time period T5 is arranged to wake up and control the analog circuit 135 and to control the baseband signal circuit unit 150 in the digital circuit 140 switching from the clock gated mode to the normal reception mode. The time period T5 is much smaller than the time period T1. For example (but not limited), the estimated length of the time period T5 may be 0.1-1 microseconds.

Then, during the time period T6, the control circuit 145 controls the digital circuit 140, e.g., the baseband signal circuit unit 150, to perform the power detection. For example, in this application scenario, although the beginning of the synchronization preamble of the beacon as shown in FIG. 2 has arrived at the communication device 100 at a specific time point in the time period T6; however, during the time period T6 the result obtained by the power detection may not meet the expected requirements. The control circuit 145 decides not to perform subsequent CCA detection and then enters the standby mode. Accordingly, in this situation, the control circuit 145 controls the analog circuit 135 entering the standby mode again and controls the baseband signal circuit unit 150 in the digital circuit 140 entering the clock gated mode again to save power. It should be noted that the time period T7 indicates a time period during which the analog circuit 135 is in the standby mode and the baseband signal circuit unit 150 in the digital circuit 140 enters the clock gated mode to save power, wherein the time length of the time period T7 can be configured to be identical to that of time period T4 or can be configured to be different (but not limited).

Similarly, after the time period T7 ends, during the time period T8, the control circuit 145 controls the analog circuit 135 to be awakened and controls the baseband signal circuit unit 150 in the digital circuit 140 switching from the clock gated mode into the signal reception mode. The time period T8 is also much smaller than the time period T1. For example, the estimated length of the time period T8 may be 0.1-1 microseconds (but not limited).

Then, similarly, during the time period T9, the control circuit 145 controls the digital circuit 140, e.g., the baseband signal circuit unit 150, to perform the power detection. For example, in this application scenario, the control circuit 145 determines that the result obtained by the power detection has met the expected requirements, and then performs the CCA detection. In this application scenario, the resultant signal obtained by the CCA detection is pulled up ('1'), and this indicates that the channel now is not idle (i.e., the expected beacon has arrived). Therefore, after the time period T9 ends, the communication device 100 will enter the normal reception mode to receive the contents of the beacon, and in this situation all the modules of the digital circuit 140 will enter the normal signal reception mode.

As shown in FIG. 2, a beacon signal includes a synchronization preamble signal and a beacon data content signal. In this application scenario, the communication device 100 can enter a reception mode ready to receive the beacon signal before the beacon content data signal arrives. Even though a part of the synchronization preamble signal is missed, the communication device 100 can still successfully receive the content of the beacon signal. In practice, in this example, the communication device 100 further has a margin of the time period T10. As long as the time length of the time period T10 is greater than a specific required time length, the communication device 100 can still successfully receive and find a start of frame delimiter (SFD). Thus, even if the beginning of the synchronization preamble signal of the beacon signal is missed during the time period of the power detection, the SFD of the beacon signal can still be found and the beacon signal can be successfully received. Further, it should be noted that, after successfully receiving the beacon signal, the communication device 100 can keep the analog circuit 135 in the signal reception mode, switch it to the shutdown mode, or switch it to the standby mode according to different requirements. This is not a limitation of the present invention.

Figure 3:
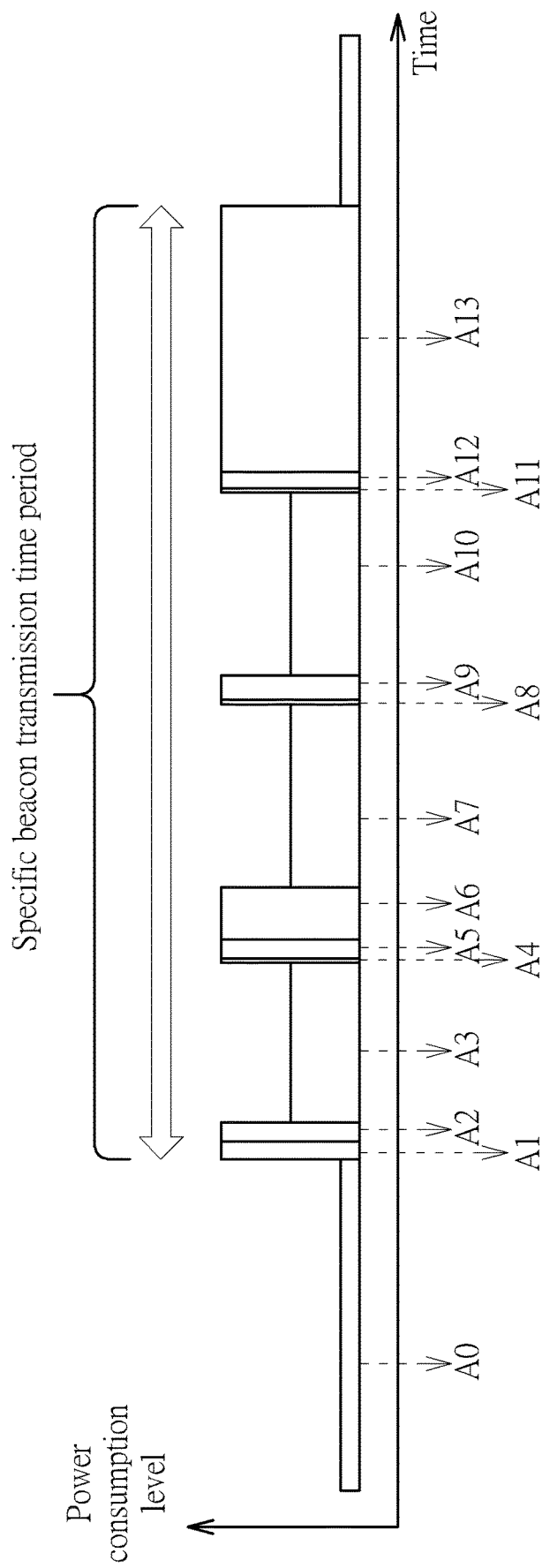
FIG. 3 is a schematic timing diagram of the operations of the communication device shown in FIG. 1 in a second application scenario.

Please refer to FIG. 3. FIG. 3 is a schematic timing diagram of the operations of the communication device 100 shown in FIG. 1 in a second application scenario. As shown in FIG. 3, in the second application scenario, the communication device 100 for example is in a power saving mode such as a target wake time (TWT) mode to sleep for a long time period. The TWT mode refers to a mode in which the communication device 100 uses a timing synchronization function (TSF) to save power in compliance with the IEEE 802.11 specification. Since sleeping for a long time period in the TWT mode still causes the transmitter and receiver become out of synchronization due to that their clocks have a difference, the base station such as an access point (AP) in the TWT mode is arranged to send a beacon signal to the communication device 100 for synchronizing their clocks. For example, the base station may choose to periodically send a beacon signal to the communication device 100 at any point during a specific beacon transmission time. The total time length of the specific beacon transmission time is about 102-307.2 milliseconds (but not limited), and the communication device 100 can use the provided technical solution of the invention in this application to receive the beacon signal, so as to significantly reduce the power consumption of the analog circuit 135 and digital circuit 140 . The operations of the communication device 100 in the second application scenario are similar to those in the first application scenario; the description is as follows.

As shown in FIG. 3, during the time period A0, the communication device 100 for example is in the LSP mode such as the TWT mode. In this situation, the communication device 100 is in the sleep state and is not arranged to receive beacons. The analog circuit 135 and the elements (or modules) of the digital circuit 140 are powered off. Then, the driving circuit 130 for example can expect that a starting time point of the specific beacon transmission time, and thus sends a trigger signal to the control circuit 145. In response to the trigger signal sent by the driving circuit 130 through the communication interface 125, the control circuit 145 can except and know that it will be needed to receive a beacon signal. Then, during the time period A1, the control circuit 145 wakes up and controls the analog circuit (i.e., the RF signal circuit unit) 135 to perform the RF setting operation and make the analog circuit 135 operate in the normal state of RF signal transmission and reception, and also wakes up and controls a specific portion of elements/modules of the digital circuit 140 to operate in a normal state. For example, the specific portion of elements/modules may be the power detection module 150A and channel state detection module 150B in the baseband signal circuit unit 150. In this example, the other portions of elements/modules are not yet awakened. Alternatively, in other embodiment, the control circuit 145 may control a specific element or module in the MAC circuit unit 155 to be awakened, and controls the other modules be not awakened. The time length of the time period A1 is shorter than the time length of the time period T1 shown in FIG. 2.

During the time period A2, the control circuit 145 controls the digital circuit 140, e.g., the baseband signal circuit unit 150, to perform the power detection. When the result of the power detection meets the expected requirements (e.g., the RSSI value is greater than a specific threshold), the control circuit 145 controls the digital circuit 140 performing the CCA detection; instead, the control circuit 145 will determine and control the analog circuit 135 and the digital circuit 140 returning back to the LPS mode to save power. For example, in this application scenario, at the end of the time period A2, the control circuit 145 determines that the result obtained by the power detection does not meet the expected requirements. Then, during the time period A3, the control circuit 145 controls the elements or modules of the analog circuit 135 and digital circuit 140 returning back to the LPS mode to save power. For example, in this situation it can be predicted that it will be needed to receive a beacon signal. Therefore, in order to save power and quickly switch to the normal signal reception mode, the elements or modules of the analog circuit 135 and the digital circuit 140 will enter the standby mode instead of the shutdown mode.

Similarly, after the time period A3 ends, during the time period A4, the elements or modules of the analog circuit 135 and the digital circuit 140 are switched from the standby mode back to the normal signal reception mode. During the time period A5, the digital circuit 140, e.g., the baseband signal circuit unit 150, performs the power detection and assessment. In this situation, the result obtained by the power detection meets the expected requirements, and then during the time period A6 the digital circuit 140 performs the CCA detection and assessment. In this example, the resultant signal obtained by the CCA detection is not pulled up ('0'), and this indicates that the channel now is idle. Thus, during the time period A7, the elements or modules of the analog circuit 135 and the digital circuit 140 enter the standby mode again. Similarly, after the time period A7 ends, during the time period A8, the elements or modules of the analog circuit 135 and the digital circuit 140 are switched from the standby mode back to the normal signal reception mode, and during the time period A9 the digital circuit 140, e.g., the baseband signal circuit unit 150, performs the power detection and assessment. In this situation, for example, the result obtained by the power detection does not meet the expected requirements, and then during the period of time period A10 the control circuit 145 controls the digital circuit 140 not performing the CCA detection and assessment and makes the elements or modules of the analog circuit 135 and the digital circuit 140 enter the standby mode again to save power. Similarly, after the time period A10 ends, during the time period A11, the elements or modules of the analog circuit 135 and the digital circuit 140 are switched from the standby mode back to the normal signal reception mode. During the time period A12, the digital circuit 140, e.g., the baseband signal circuit unit 150, performs the power detection and assessment. In this situation, for example, the result obtained by the power detection meets the expected requirements, and therefore during the period of time period A13 the digital circuit 140 is arranged to perform the CCA detection and assessment. The digital circuit 140 may determine that the resultant signal obtained by the CCA detection is pulled up ('1'), and this indicates that the channel now is not idle (that is, the expected beacon has arrived). Thus, during the same time period A13, the communication device 100 enters the normal signal reception mode to receive the content of the beacon signal. In this situation, all modules of the digital circuit 140 enter the normal signal reception mode.

Figure 4:
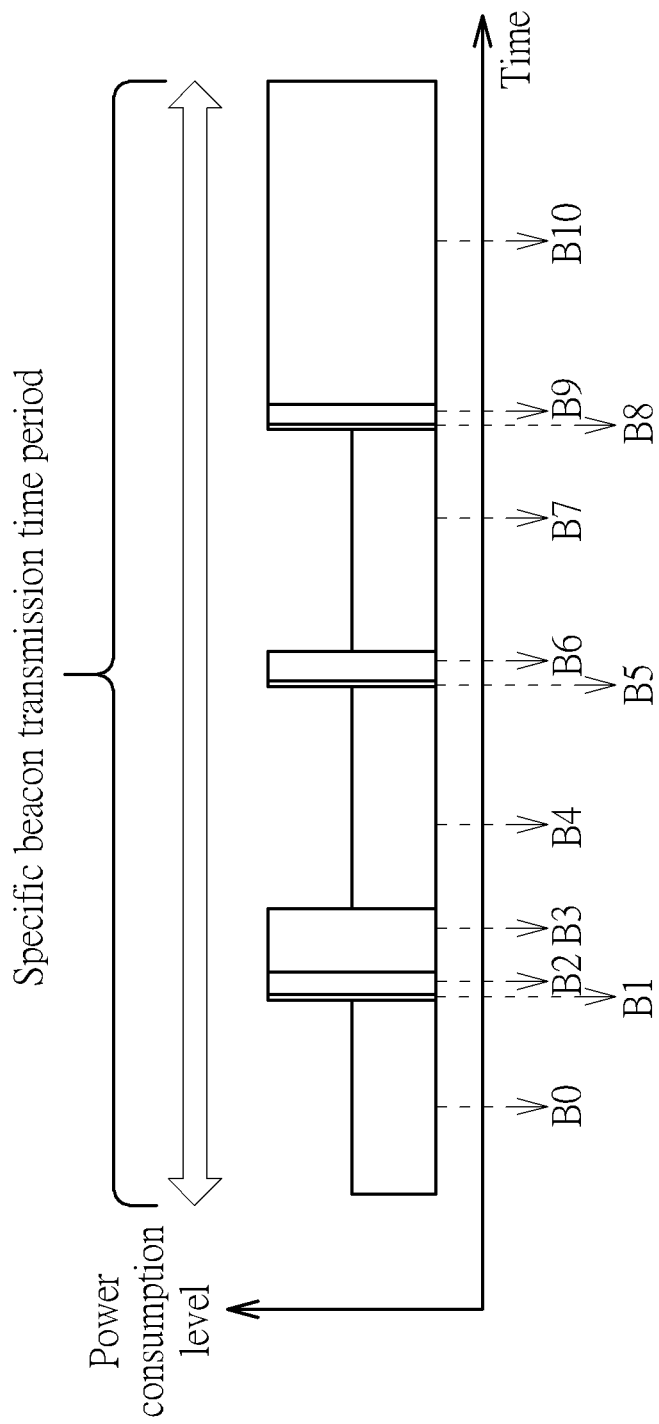
FIG. 4 is a schematic timing diagram of the operations of the communication device shown in FIG. 1 in a third application scenario.

Please refer to FIG. 4. FIG. 4 is a schematic timing diagram of the operations of the communication device 100 shown in FIG. 1 in a third application scenario. In the third application scenario, the communication device 100 can predict that the current channel is a passive channel, and the base station of the wireless network will send a beacon signal to the communication device 100, but the communication device 100 cannot predict the timing of actually sending the beacon signal. The communication device 100 can only predict that the base station will transmit the beacon signal at a specific time point during a specific beacon transmission time period.

Similarly, as shown in FIG. 4, during the time period B0, the elements or modules of the analog circuit 135 and the digital circuit 140 of the communication device 100 are, for example, in the LPS mode such as the standby mode in which the elements or modules are powered but do not perform signal processing. Then after the time period B0 ends, during the time period B1, the control circuit 145 controls the analog circuit (i.e., the RF signal circuit unit) 135 to be awakened to perform the RF setting operation and make the analog circuit 135 operate in the normal RF signal transmission and reception state. The control circuit 145 controls a specific portion of elements (or modules) of the digital circuit 140 to be awakened and operate in a normal state. Then, during the time period B2, the control circuit 145 controls the digital circuit 140, e.g., the baseband signal circuit unit 150, to perform the power detection. When the result of the power detection meets the expected requirements (for example the RSSI value is greater than a specific threshold), the control circuit 145 controls the digital circuit 140 performing the CCA detection; instead, the control circuit 145 will determine and control the analog circuit 135 and the digital circuit 140 returning back to the LPS mode to save power. In this application scenario, at the end of the time period B2, the control circuit 145 determines that the result obtained by the power detection meets the expected requirements, and therefore during the time period B3 the digital circuit 140 such as the baseband signal circuit unit 150 performs the CCA detection and assessment. In this example, the resultant signal obtained by the CCA detection is not pulled up ('0'), and this indicates that the current channel is idle. Thus, during the time period B4, the elements or modules of the analog circuit 135 and the digital circuit 140 will enter the standby mode again.

Similarly, after the time period B4 ends, during the time period B5, the elements or modules of the analog circuit 135 and the digital circuit 140 are switched from the standby mode back to the normal signal reception mode. During the time period B6, the digital circuit 140, e.g., the baseband signal circuit unit 150, performs the power detection and assessment. In this situation, the result obtained by the power detection does not meet the expected requirements, and then during the period of time period B7 the control circuit 145 controls the digital circuit 140 not performing the CCA detection and assessment; the control circuit 145 controls the elements or modules of the analog circuit 135 and the digital circuit 140 entering the standby mode again to save power. Similarly, after the time period B7 ends, during the time period B8, the elements or modules of the analog circuit 135 and the digital circuit 140 are switched from the standby mode back to the normal signal reception mode, and during the time period B9 the digital circuit 140, e.g., the baseband signal circuit unit 150, performs the power detection and assessment. In this situation, the result obtained by the power detection meets the expected requirements, and then during the time period B10 the digital circuit 140 will perform the CCA detection and assessment. For example, it may determine that the resultant signal obtained by the CCA detection is pulled up ('1') which indicates that the channel now is not idle (that is, the expected beacon has arrived), and therefore during the same time period B10 the communication device 100 will enter the normal signal reception mode to receive the content of the beacon signal. In this example, all modules of the digital circuit 140 will enter the normal signal reception mode.

Figure 5:
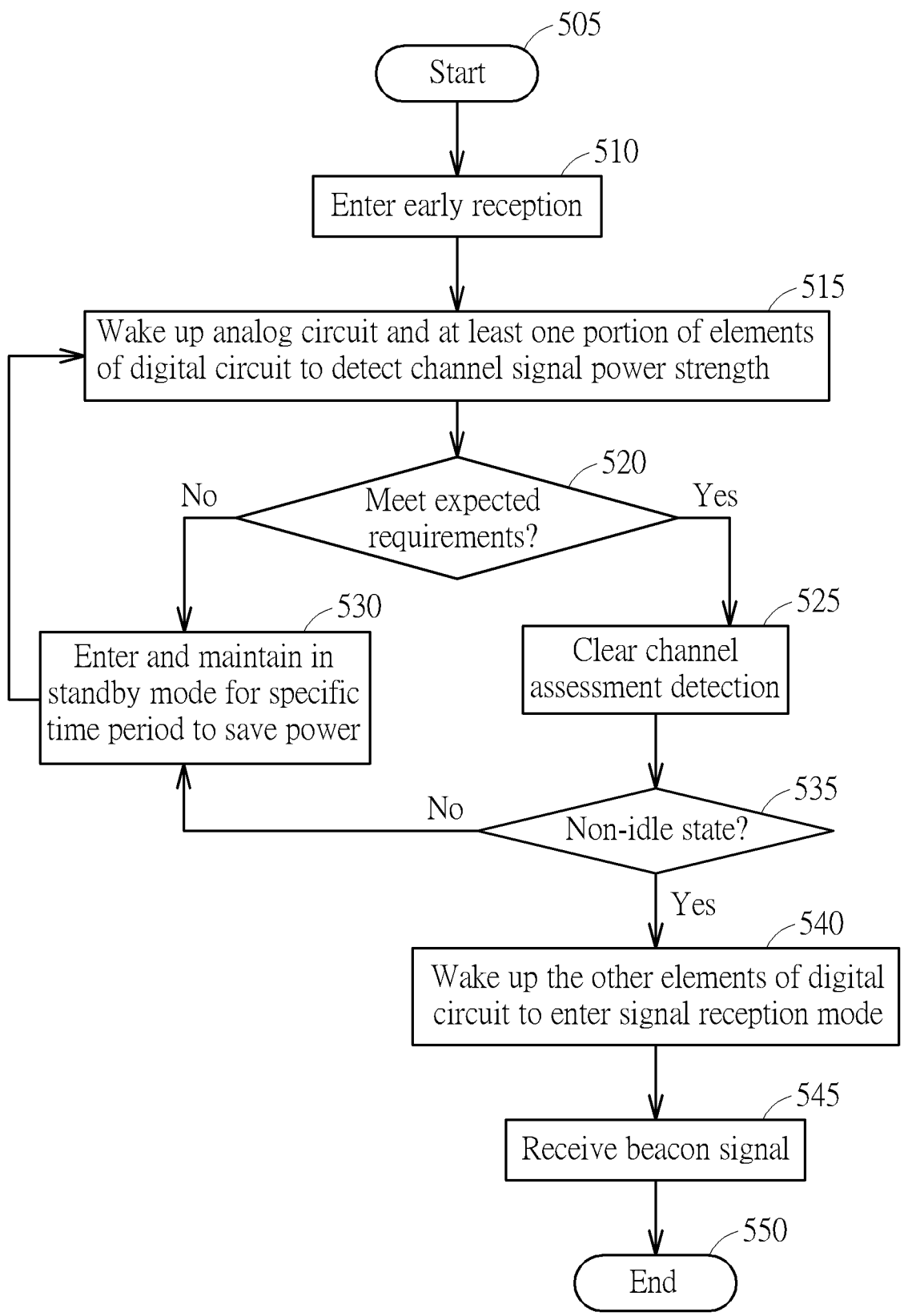
FIG. 5 is a flowchart diagram of the operations of the communication circuit shown in FIG. 1 according to an embodiment of the present invention.

FIG. 5 is a flowchart diagram of the operations of the communication circuit 115 shown in FIG. 1 according to an embodiment of the present invention. Provided that substantially the same result is achieved, the steps of the flowchart shown in FIG. 5 need not be in the exact order shown and need not be contiguous, that is, other steps can be intermediate. Steps are detailed in the following:

Step 505: start;

Step 510: the communication circuit 115 enters an early reception mode or a predetermined early reception period;

Step 515: Wake up the analog circuit 135 and at least one portion of elements of the digital circuit 140 to detect the signal power strength of the channel;

Step 520: Determine whether the signal power strength meets the expected requirements or not; if the signal power strength meets the expected requirements, the flow proceeds to Step 525, otherwise, the flow proceeds to Step 530;

Step 525: Control the at least one portion of the elements of the digital circuit 140 to perform clear channel assessment detection;

Step 530: Control the analog circuit 135 and the digital circuit 140 to enter and maintain in the standby mode for a specific time period to save power;

Step 535: Determine whether the clear channel assessment detection indicates a non-idle state; if the clear channel assessment detection indicates a non-idle state (that is, it does not indicate an idle state), the flow proceeds to Step 540, otherwise, the flow proceeds to Step 530;

Step 540: Determine that an initial synchronization signal of the beacon signal has arrived at the communication circuit, and wake up the other elements of the digital circuit 140 to enter a signal reception mode;

Step 545: Start to receive subsequent content signals of the beacon signal; and

Step 550: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication circuit for communicating with a base station through a channel, comprising:
    an analog circuit, coupled to an antenna unit, for receiving and processing a beacon signal, sent from the antenna unit through the channel, to generate a baseband communication signal;
    a digital circuit, coupled to the analog circuit, for processing the baseband communication signal; and
    a control circuit, coupled to the analog circuit and the digital circuit, for waking up the analog circuit and at least one portion of elements of the digital circuit to detect a signal power strength of the channel during a predetermined early reception period corresponding to the beacon signal, and for determining whether to control the analog circuit and the digital circuit entering a standby mode to save power without entering a shutdown mode, which consumes less power than the standby mode, in response to that the signal power strength is smaller than a specific threshold;
    wherein in response to that the signal power strength is greater than the specific threshold, the control circuit controls the at least one portion of the elements of the digital circuit performing a clear channel assessment detection; in response to that the signal power strength is greater than the specific threshold and the clear channel assessment detection does not indicate an idle state, the control circuit determines that an initial synchronization signal of the beacon signal has arrived at the communication circuit, and then wakes up other portions of the elements of the digital circuit to enter a signal reception mode; in response to that the signal power strength is greater than the specific threshold and the clear channel assessment detection indicates the idle state, the control circuit determines that the initial synchronization signal of the beacon signal has not yet arrived at the communication circuit, and then controls the analog circuit and the digital circuit entering the standby mode.

2. The communication circuit of claim 1, wherein in response to that the signal power strength is smaller than the specific threshold, the control circuit determines that the initial synchronization signal of the beacon signal has not yet arrived at the communication circuit through the channel, and the control circuit controls the analog circuit and the digital circuit entering the standby mode; and in response to that the signal power strength is greater than the specific threshold, the control circuit determines that the initial synchronization signal of the beacon signal has arrived at the communication circuit, and the control circuit wakes up other portions of the elements of the digital circuit to enter the signal reception mode.

3. The communication circuit of claim 1, wherein a start time point of the predetermined early reception period follows the shutdown mode, the standby mode, or a target wake time (TWT) mode.

4. The communication circuit of claim 1, wherein the communication circuit conforms to a communication standard specification of a wireless local area network system, and the base station is a wireless network access point.

5. The communication circuit of claim 1, wherein the at least one portion of the elements of the digital circuit comprises a power detection module, which is disposed in a baseband signal circuit unit and used for detecting a received signal strength indication (RSSI).

6. A method of a communication circuit for communicating with a base station through a channel, comprising:
    using an analog circuit to receive and process a beacon signal, sent from an antenna unit through the channel, to generate a baseband communication signal;
    using a digital circuit for processing the baseband communication signal;
    waking up the analog circuit and at least one portion of elements of the digital circuit to detect a signal power strength of the channel during a predetermined early reception period corresponding to the beacon signal;
    in response to the signal power strength being smaller than a specific threshold, determining whether to control the analog circuit and the digital circuit entering a standby mode to save power without entering a shutdown mode, which consumes less power than the standby mode, when the signal power strength is smaller than a specific threshold;
    in response to the signal power strength being greater than the specific threshold, controlling the at least one portion of the elements of the digital circuit performing a clear channel assessment detection;
    in response to the signal power strength being greater than the specific threshold and the clear channel assessment detection not indicating indicate an idle state, determining that an initial synchronization signal of the beacon signal has arrived at the communication circuit, and waking up other portions of the elements of the digital circuit to enter a signal reception mode; and
    in response to the signal power strength being greater than the specific threshold and the clear channel assessment detection indicating indicates the idle state, determining that the initial synchronization signal of the beacon signal has not yet arrived at the communication circuit, and controlling the analog circuit and the digital circuit entering the standby mode.

7. The method of claim 6, further comprising:
    in response to that the signal power strength is smaller than the specific threshold, determining that the initial synchronization signal of the beacon signal has not yet arrived at the communication circuit through the channel, and controlling the analog circuit and the digital circuit entering the standby mode; and
    in response to that the signal power strength is greater than the specific threshold, determining that the initial synchronization signal of the beacon signal has arrived at the communication circuit, and waking up other portions of the elements of the digital circuit to enter the signal reception mode.

8. The method of claim 6, wherein a start time point of the predetermined early reception period follows the shutdown mode, the standby mode, or a target wake time (TWT) mode.

* * * * *